(12) United States Patent
Richer De Forges et al.

(10) Patent No.: US 10,120,087 B2
(45) Date of Patent: Nov. 6, 2018

(54) METHOD AND SYSTEM WITH LOW-FREQUENCY SEISMIC SOURCE

(71) Applicant: CGG SERVICES SA, Massy (FR)

(72) Inventors: Herve Richer De Forges, Versailles (FR); Karine Desrues, Massy (FR); Risto Siliqi, Paris (FR)

(73) Assignee: CGG SERVICES SAS, Massy (FR)

( * ) Notice: Subject to any disclaimer, the term of this patent is extended or adjusted under 35 U.S.C. 154(b) by 186 days.

(21) Appl. No.: 15/155,188

(22) Filed: May 16, 2016

(65) Prior Publication Data

US 2016/0259072 A1    Sep. 8, 2016

Related U.S. Application Data

(63) Continuation of application No. PCT/IB2015/000190, filed on Jan. 19, 2015.

(60) Provisional application No. 61/929,520, filed on Jan. 21, 2014.

(51) Int. Cl.
   *G01V 1/38*    (2006.01)
   *G01V 1/00*    (2006.01)
   *G01V 1/047*   (2006.01)

(52) U.S. Cl.
   CPC .......... *G01V 1/006* (2013.01); *G01V 1/3808* (2013.01); *G01V 1/3843* (2013.01); *G01V 1/3852* (2013.01); *G01V 1/047* (2013.01)

(58) Field of Classification Search
   CPC .... G01V 1/006; G01V 1/3808; G01V 1/3852; G01V 1/3843; G01V 1/047
   USPC .......................................................... 367/15
   See application file for complete search history.

(56) References Cited

U.S. PATENT DOCUMENTS

| | | | |
|---|---|---|---|
| 2,771,961 | A | 11/1956 | Blake, Jr. |
| 3,413,596 | A | 11/1968 | Backus et al. |
| 3,437,170 | A | 4/1969 | Brock et al. |
| 3,506,955 | A | 4/1970 | Backus et al. |
| 3,885,225 | A | 5/1975 | Anstey et al. |
| 3,893,539 | A | 7/1975 | Mott-Smith |
| 4,446,542 | A | 5/1984 | Beckerle |
| 4,805,160 | A | 2/1989 | Ishii et al. |
| 4,914,636 | A | 4/1990 | Garrotta |
| 4,918,668 | A | 4/1990 | Sallas |
| 4,970,696 | A | 11/1990 | Crews et al. |
| 5,117,396 | A | 5/1992 | Castile et al. |
| 5,335,208 | A | 8/1994 | Sansone |

(Continued)

FOREIGN PATENT DOCUMENTS

| | | |
|---|---|---|
| CN | 101389158 A | 3/2009 |
| EP | 0553053 A2 | 7/1993 |

(Continued)

OTHER PUBLICATIONS

International Search Report in related International Application No. PCT/162015/000190, dated Dec. 1, 2016.

(Continued)

*Primary Examiner* — Daniel L Murphy
(74) *Attorney, Agent, or Firm* — Patent Portfolio Builders PLLC

(57) ABSTRACT

A marine source element is configured to generate seismic waves. The source element includes a body and a source actuator attached to the body and configured to generate the seismic waves. The body is autonomous from a vessel towing streamers along a pre-plot line associated with a seismic survey.

20 Claims, 13 Drawing Sheets

(56) References Cited

U.S. PATENT DOCUMENTS

| | | |
|---|---|---|
| 5,687,137 A | 11/1997 | Schmidt et al. |
| 5,691,957 A | 11/1997 | Spiesberger |
| 5,894,450 A | 4/1999 | Schmidt et al. |
| 6,285,956 B1* | 9/2001 | Bennett ............... B63B 21/66 367/16 |
| 6,510,107 B2 | 1/2003 | Diachok |
| 6,906,981 B2 | 6/2005 | Vaage |
| 6,942,059 B2 | 9/2005 | Smith |
| 7,257,049 B1 | 8/2007 | Laws et al. |
| 7,391,673 B2 | 6/2008 | Regone et al. |
| 7,760,587 B2 | 7/2010 | Abbot et al. |
| 8,081,540 B2 | 12/2011 | Ross |
| 8,094,514 B2 | 1/2012 | Tenghamn |
| 8,205,711 B2 | 6/2012 | Hopperstad et al. |
| 8,565,041 B2 | 10/2013 | Ruet |
| 8,600,592 B2 | 12/2013 | Heard et al. |
| 8,619,497 B1 | 12/2013 | Sallas et al. |
| 8,837,259 B2 | 9/2014 | Ruet et al. |
| 9,864,080 B2* | 1/2018 | Tenghamn ............ G01V 1/135 |
| 2006/0076183 A1 | 4/2006 | Duren et al. |
| 2009/0097356 A1* | 4/2009 | Haldorsen ............ G01V 1/42 367/24 |
| 2009/0245021 A1* | 10/2009 | Robertsson ........... B63B 21/56 367/21 |
| 2010/0118647 A1 | 5/2010 | Tenghamn |
| 2010/0226203 A1 | 9/2010 | Buttle et al. |
| 2010/0302900 A1 | 12/2010 | Tenghamn |
| 2011/0170375 A1 | 7/2011 | Thompson et al. |
| 2011/0199857 A1 | 8/2011 | Garden |
| 2012/0014212 A1 | 1/2012 | Eick et al. |
| 2012/0314536 A1 | 12/2012 | Bagaini |
| 2013/0121114 A1 | 5/2013 | Vahida |
| 2013/0135966 A1 | 5/2013 | Rommel et al. |
| 2013/0333974 A1 | 12/2013 | Coste et al. |
| 2013/0343153 A1 | 12/2013 | Laws |
| 2014/0064027 A1 | 3/2014 | Winnett |

FOREIGN PATENT DOCUMENTS

| | | |
|---|---|---|
| GB | 2394049 A | 4/2004 |
| WO | 2005/120943 A1 | 12/2005 |
| WO | 2012/078966 A2 | 6/2012 |

OTHER PUBLICATIONS

Written Opinion of the International Searching Authority in related International Application No. PCT/IB2015/000190, dated Dec. 1, 2016.

"The Barrow Arctic Ocean Observatory (BAO)", Project Description, Results from Prior NSF Support, (downloaded from the internet May 13, 2016 https://www.sfos.uaf.edu/directory/faculty/johnson/BAO.html).

M. Landro et al., "Marine Seismic Sources Part II", GEO ExPro (Petroleum Geoscience Magazine), 2010, vol. 7, No. 2 (downloaded from the internet May 13, 2016 http://www.geoexpro.com/articles/2010/02/marine-seismic-sources-part-ii).

Y. Le Gall et al., "Ultra-Deep Low-Frequency Sub-Bottom Profiler for AUV & ROV", The Journal of the Acoustical Society of America, 123, 3234, 2008.

* cited by examiner

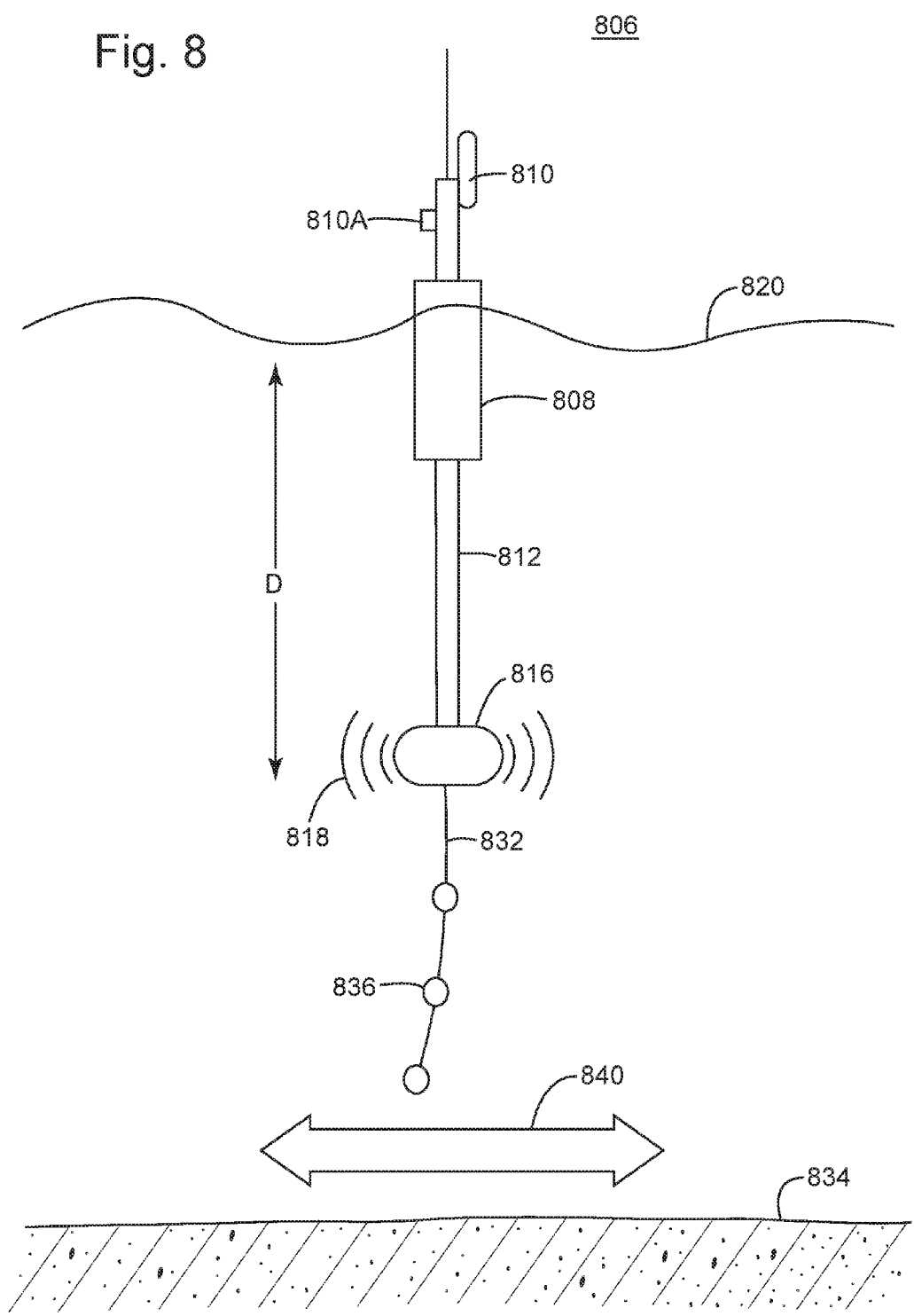

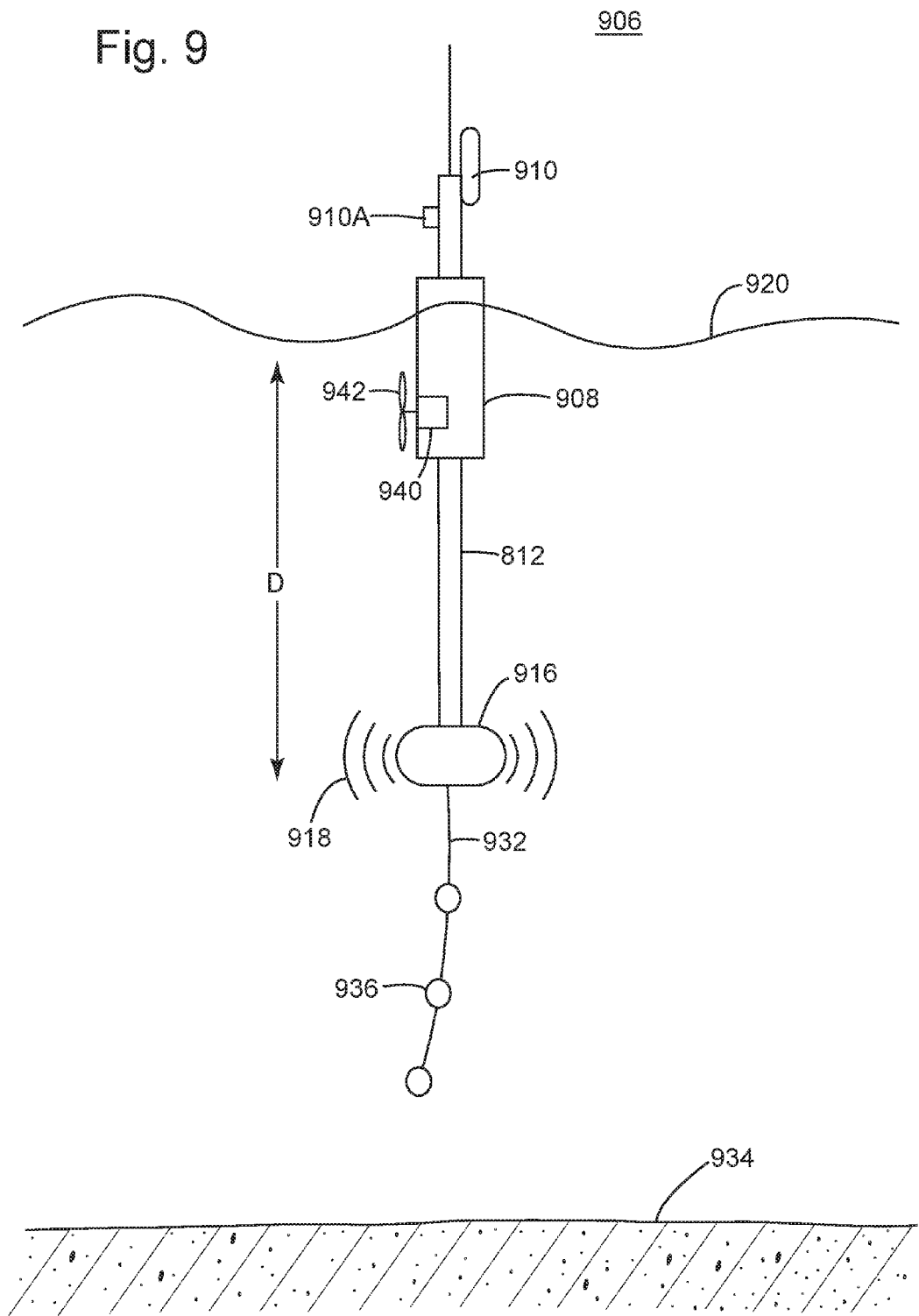

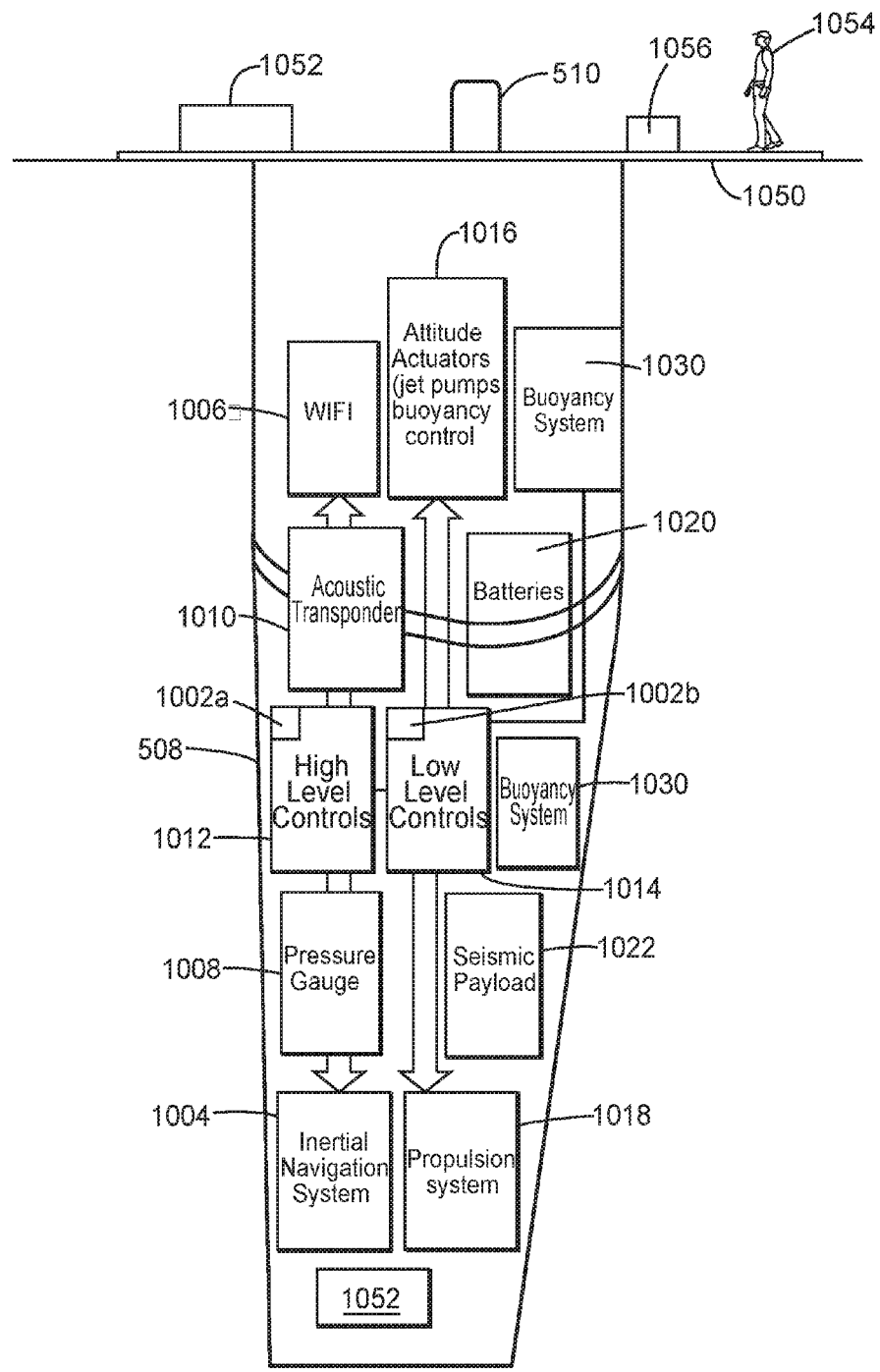

METHOD AND SYSTEM WITH LOW-FREQUENCY SEISMIC SOURCE

CROSS REFERENCE TO RELATED APPLICATIONS

The present application is a continuation of International Application No. PCT/IB2015/000190, filed Jan. 19, 2015, published as International Publication No. WO 2015/110912, which is related to and claims the benefit of priority under 35 U.S.C. § 119(e) to U.S. Provisional Application No. 61/929,520 filed on Jan. 21, 2014, the entire contents of which is hereby incorporated by reference.

BACKGROUND

Technical Field

Embodiments of the subject matter disclosed herein generally relate to methods and systems and, more particularly, to mechanisms and techniques for increasing low-frequency content of seismic energy generated during a marine seismic survey.

Discussion of the Background

Reflection seismology is a method of geophysical exploration to determine the properties of a portion of a subsurface layer in the earth, information that is especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, a seismic survey system 100, as illustrated in FIG. 1, includes a vessel 102 that tows plural streamers 110 (only one is visible in the figure) and a seismic source array 130. Streamer 110 is attached through a lead-in cable (or other cables) 112 to vessel 102, while source array 130 is attached through an umbilical 132 to the vessel. A head float 114, which floats at the water surface 104, is connected through a cable 116 to the head end 110A of streamer 110, while a tail buoy 118 is connected, through a similar cable 116, to the tail end 110b of streamer 110. Head float 114 and tail buoy 118 are used, among other things, to maintain the streamer's depth. Seismic sensors 122 are distributed along the streamer and configured to record seismic data. Seismic sensors 122 may include a hydrophone, geophone, accelerometer or a combination thereof. Positioning devices 128 are attached along the streamer and controlled by a controller 126 for adjusting a position of the streamer according to a survey plan.

Source array 130 has plural source elements 136, which are typically air guns. A vessel can tow multiple source arrays, e.g., 6 source arrays. The source elements are attached to a float 137 to travel at desired depths below the water surface 104. During operation, vessel 102 follows a predetermined path T while source elements (usually air guns) 136 emit seismic waves 140. These waves bounce off the ocean bottom 142 and other layer interfaces below the ocean bottom 142 and propagate as reflected/refracted waves 144, which are recorded by sensors 122. The positions of both source elements 136 and recording sensors 122 may be estimated based on underwater positioning devices 128 or aerial positioning devices such as GPS systems 124 or acoustic or compasses devices and recorded together with the seismic data in a storage device 127 onboard the vessel. Controller 126 has access to the seismic data and may be used to achieve quality control or even fully process the data. Controller 126 may also be connected to the vessel's navigation system and other elements of the seismic survey system, e.g., positioning devices 128.

Because of the development of 4-dimensional (4D) seismic acquisition, exploration in deeper or more complex areas, or the need to identify narrower geological structures, subsurface imaging requires more and more accurate and complete data. To achieve these objectives, and to open up new opportunities for oil and gas exploitation, the seismic bandwidth (generated and recorded) has to be wider, particularly on the low-frequency side. Thus, there is a desire in the industry to have low-frequency marine source elements that emit seismic waves having a frequency in the 0.5-5 Hz range. Although such source elements may exist, they are designed to be small so that they can be towed behind a vessel. One such configuration that uses plural source elements is illustrated in FIGS. 2 and 3.

FIG. 2 shows a seismic source array 200 having plural source elements, which are grouped into two high-frequency sub-arrays 202 and a single low-frequency sub-array 204 that are towed by a vessel 201. In one application, all the sub-arrays are towed below the water line WL. Other configurations for the sub-array may be possible. Each sub-array may have plural source elements. In one application, the high-frequency sub-arrays 202 are towed at a depth of about 5 m, while the low-frequency sub-array 204 is towed at a depth of about 25 m.

A side view of a source array 300 that is part of marine acquisition system 306 is shown in FIG. 3 and includes high-frequency seismic sources 302A (e.g., air guns) and low-frequency seismic sources 304A. System 306 includes towing vessel 301 that tows source array 300. Source array 300 may include, as discussed with regard to FIG. 2, one or more high-frequency sub-arrays 302 positioned at a depth H1 below the water line and one or more low-frequency sub-arrays 304 positioned at a depth H2 below the water line, where H2 is deeper than H1. Depth controllers 310 may be located on or next to each sub-array for maintaining a desired depth. Umbilicals 311 connect each sub-array to vessel 301. An umbilical may include a strength member, command and data capabilities, electrical power and pneumatic air supply.

Mechanical interface 312 connects corresponding umbilical components to pneumatic supply system 314, power supply system 316, and command and control device 318. Command and control device 318 may include a processing unit, as described later, that is capable of receiving and processing seismic data for imaging the surveyed subsurface. Command and control device 318 may also be configured to control the seismic source array's trajectory, adjust its trajectory and control the shooting of the source elements. Command and control device 318 may interact with the vessel's navigation system.

In one application, sub-arrays 302 are configured to generate frequencies between about 10 and 200 Hz, while sub-array 304 is configured to generate frequencies between about 5 to 10 Hz. The source elements of these sub-arrays may be activated using a flip-flop scheme, a continuous scheme or any other known scheme.

A source element may be impulsive (e.g., an air gun) or vibratory. A vibratory source element is described in U.S. Pat. No. 8,837,259 (herein the '259 patent), assigned to the same assignee as the present application, the entire content of which is incorporated herein by reference. Other types of source elements are described in U.S. Patent Application Publication Nos. 2011/0170375 and 2006/0076183.

However, it is expected that high-quality, low-frequency source elements have a large size, which makes them unlikely candidates for being towed behind a vessel. Since currently used source elements have been designed to be towed by a vessel, there is a limitation to their accuracy in the low-frequency spectrum. Thus, there is a need to provide source elements and methods capable of generating high-quality, low-frequency energy.

SUMMARY

According to one embodiment, there is a marine source element configured to generate seismic waves. The source element includes a body and a source actuator attached to the body and configured to generate the seismic waves. The body is autonomous from a vessel towing streamers along a pre-plot line associated with a seismic survey.

According to another embodiment, there is a marine seismic acquisition system configured to generate low-frequency seismic waves. The system includes a vessel configured to tow at least one streamer along a pre-plot line and a high-frequency source element and at least one source element configured to float independent of the vessel.

According to still another embodiment, there is a method for generating seismic waves in water. The method includes a step of towing with a vessel at least one streamer and a high-frequency source element along a pre-plot line, a step of deploying in water at least one source element configured to float independent of the vessel, a step of activating the at least one source element to generate the seismic waves in water, and a step of recording with seismic sensors, distributed along the at least one streamer, the seismic waves reflected and/or refracted from a surveyed subsurface.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8 shows a low-frequency source element freely floating in water;

FIG. 9 shows a low-frequency source element having a propulsion system;

FIG. 10A shows an interior configuration of the body of the low-frequency source element;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a seismic source configured to generate low-frequency acoustic energy in a marine environment. However, the embodiments to be discussed next are not limited to a marine seismic source element; they may be applied to source arrays (i.e., to a collection of source elements) or even to land sources.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a marine seismic source element is configured to generate low-frequency seismic energy. The marine source element includes a body and a source actuator attached to the body and configured to generate low-frequency seismic waves. The body is free to float in water while a vessel towing streamers moves along a pre-plotted line associated with a seismic survey.

The output of various low-frequency source elements can fill in the energy often lacking in conventional marine surveys where air gun sources are used. In one application, various low-frequency source elements are presented, each of which outputs low-frequency energy over a given portion of the low-frequency range of frequencies of interest. The low-frequency range of frequencies is mainly considered to extend from 0.5 Hz up to about 5 Hz. Above 10 Hz, existing air gun sources provide adequate source strength.

Figure 1:
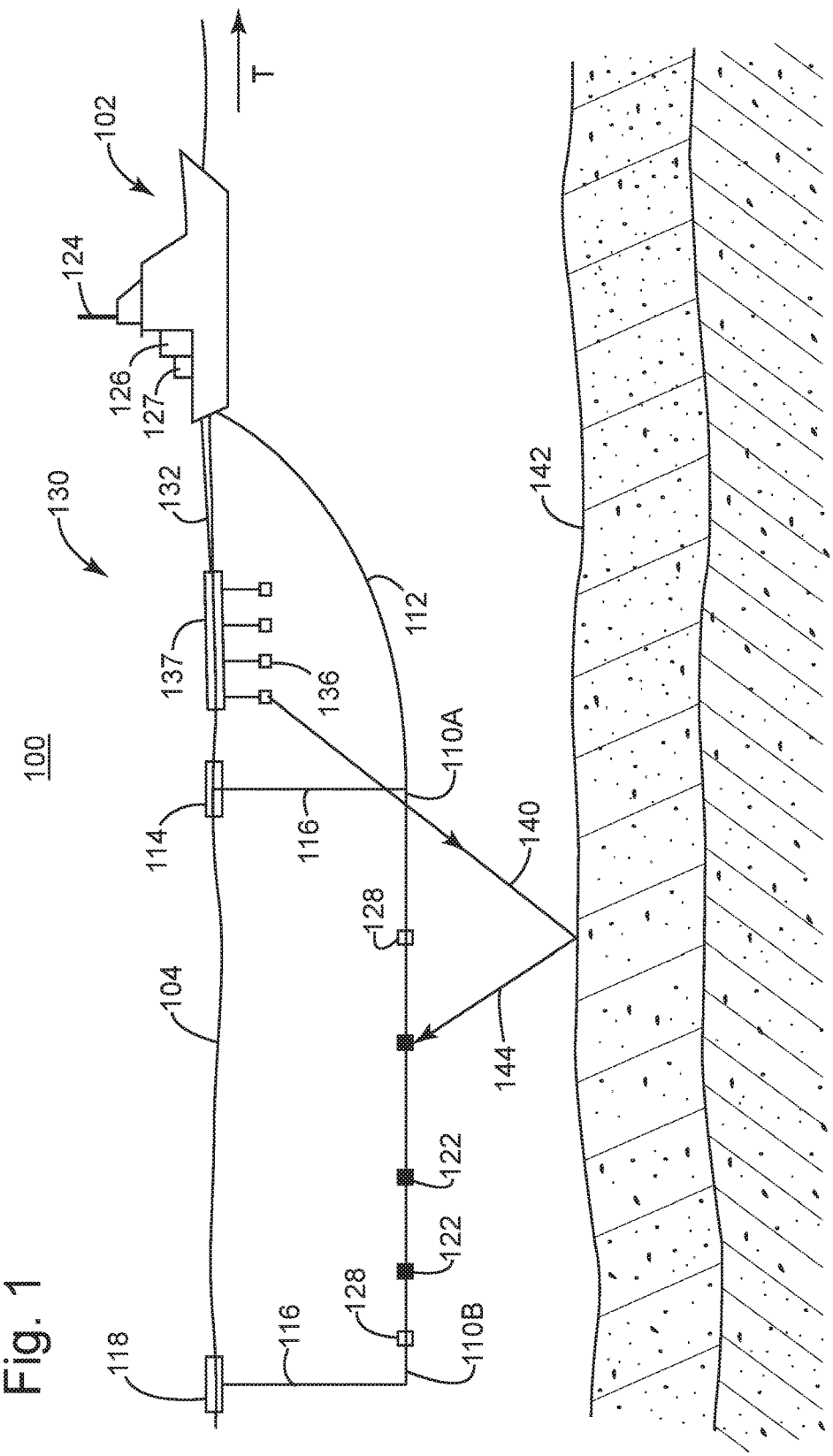
FIG. 1 is a schematic diagram of a seismic acquisition system.
Figure 2:
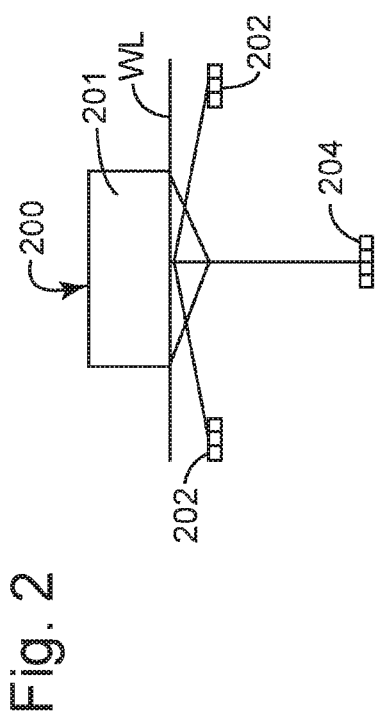
FIGS. 2 and 3 are schematic diagrams of a source array having low-frequency and high-frequency source arrays.
Figure 3:
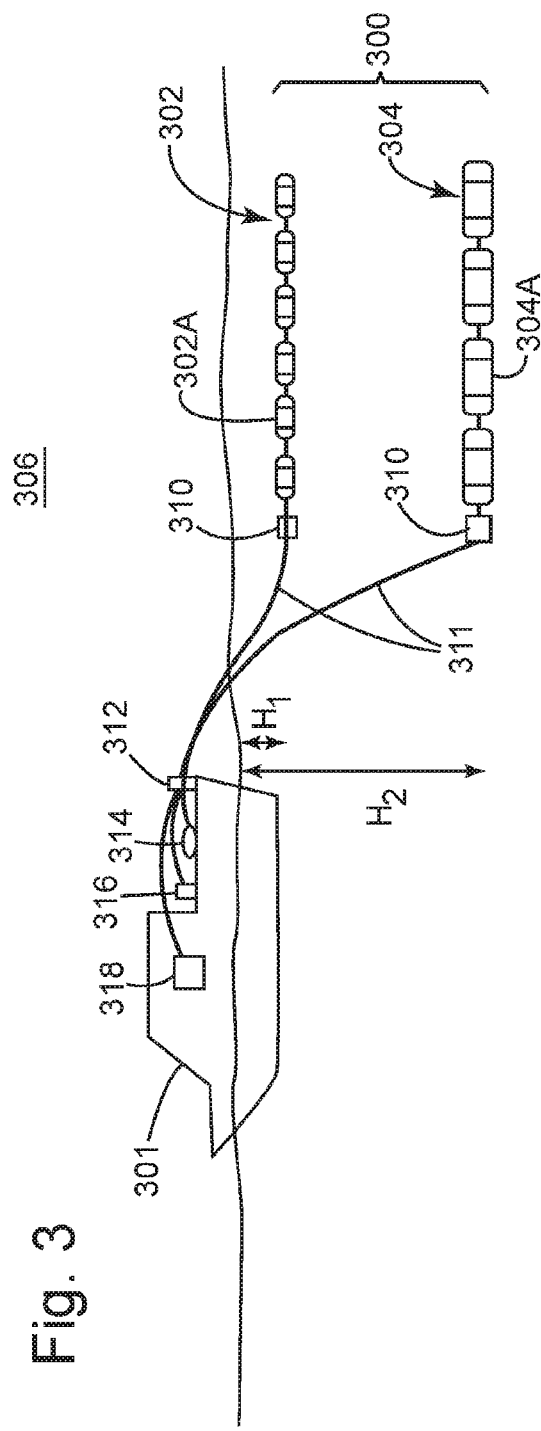
Figure 4:
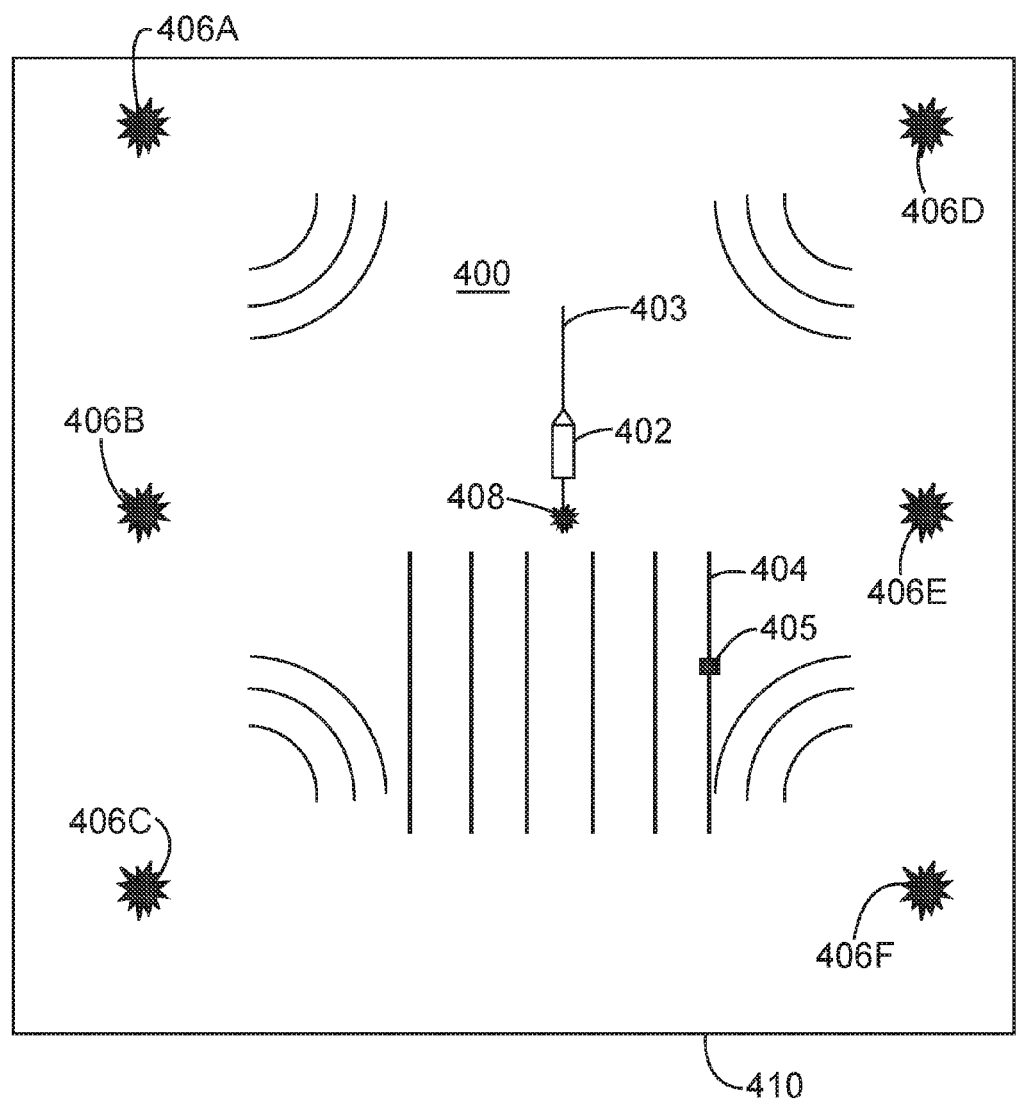
FIG. 4 is a schematic diagram of a seismic survey system that includes at least one low-frequency source element.

When implemented in an actual seismic survey system, a low-frequency seismic source element has a large size, which requires the towing vessel to expend a great amount of energy. In addition, the vessel has to offer large storage space for storing the seismic source element when not in use. Thus, according to an embodiment illustrated in FIG. 4, a seismic acquisition system 400 for collecting seismic data that includes low-frequency seismic data has at least a vessel 402 that tows one or more streamers 404 along a pre-plot line 403. Each streamer may include one or more types of sensors 405, for example, hydrophones, accelerometers, geophones, optical sensors or a combination thereof. One or more low-frequency seismic source elements 406A are located at various locations relative to the seismic acquisition plot 410. FIG. 4 shows six low-frequency seismic source elements 406A-F, but this number is exemplary and not intended to be limiting. System 400 may function with a single low-frequency source element. Vessel 402 is configured to also tow a traditional source array 408, that may include only high-frequency source elements or any combination of traditional high- and low-frequency source elements.

Regarding low-frequency source element 406A, although it may be any known source element, for example, those discussed in the Background section, an accurate low-frequency source element will be of a size that practically cannot be towed by vessel 402 while also towing streamers 404 with a predetermined speed. Those skilled in the art will appreciate that no specific sizes can be provided for such a source element. For exemplary purposes, a low-frequency source element may be as long as 10 m. For the context, note that a traditional low-frequency source element is typically less than 5 m long, and more specifically, a traditional air gun is less than 1 m long.

Such a large low-frequency source element may be comparable in size to a 40-ft. container used for marine transportation of goods. Because of this large size, it is very inefficient and expensive to tow such a source element, even if it were possible. Thus, the low-frequency source element according to this embodiment is not towed by the vessel, but rather left to float in the ocean, either anchored to the ocean bottom or not. Various implementations of such a low-frequency source element are now discussed with regard to FIGS. 5-10.

Figure 5A:
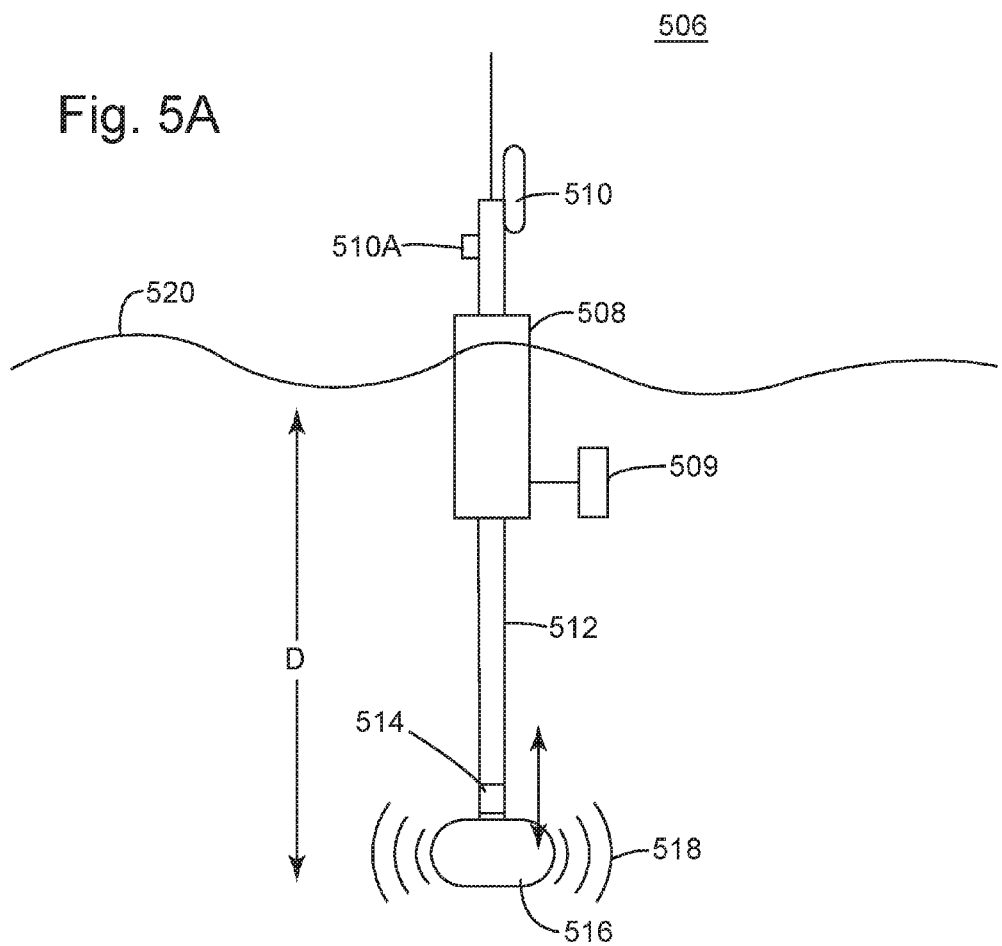
FIG. 5A shows a low-frequency source element in a functional position.

FIG. 5A shows an embodiment in which a low-frequency source element 506 has a body or housing 508 that stores the energy, generation, conversion and storage systems (to be discussed later), a communication mechanism 510 for communicating with a vessel, airborne device, or satellite (also including a GPS system 510A for establishing the source's position), and a ballast mechanism that includes a ballast rod 512 connecting body 508 to source actuator 516, which is configured to generate seismic waves 518. Ballast mechanism may include a ballast weight 514 configured to move along ballast rod 512 for changing the source element's center of mass. Alternatively, ballast weight 514 may be fixed to ballast rod 512, but its mass may be varied, for example, by allowing a volume of water to enter or leave the ballast weight. In this way, the source element may be in a towing state ready to be towed by a vessel as illustrated in FIG. 5B, at the water surface 520 until the source element is in position, at which time the ballast weight 514 is moved away, along ballast rod 512, from body 508, or the water inside ballast weight is removed, to tilt the body to a vertical position, operational state, as illustrated in FIG. 5A.

In other words, ballast weight 514 is configured to move along ballast rod 512 or change its mass so that the source element is in a towing state when the ballast weight is at one end of the ballast rod or the ballast weight has a low mass, and in a deployed state when the ballast weight is at another end of the ballast rod or it has a higher mass. In this way, the source element may still be towed by a vessel until in place and then released to float on itself as illustrate in FIG. 5A. Note that source element 506 is configured in this embodiment to float at the water surface 520, with at least the communication mechanism 510 located above the water surface. In one application, the ballast mechanism may simply be a rod and the ballast weight may be absent, as later discussed with regard to other figures. Ballast weight 514 or ballast rod 512 may include an actuation device for displacing ballast weight at a desired location along the ballast mechanism. Alternatively, ballast weight or ballast rod may have a pump or similar device for pumping water in and out of the ballast weight for adjusting its mass.

Communication mechanism 510 may transmit seismic and/or additional data to, for example, a vessel, using any known communication protocol, e.g., radio, optic, infrared, etc. Source actuator 516 may be any of the known low-frequency seismic source elements, for example, an air gun, an electro-mechanical actuator, a siren, etc., scaled at the sizes discussed above. In one application, the source actuator may be a siren seismic source or equivalent as described above in 2011/0170375. In another application, the source actuator may be similar to the vibrator described in the '259 patent. The source actuator may be configured to provide a sweep signal 518 if the source is a vibrator. The source actuator may include one or more elements that generate seismic waves. The source actuator may float under water as illustrated in FIG. 5A, but also may be set up on the ocean bottom as discussed later. The source actuator may be actuated by compressed gas, a hydraulic mechanism, thermal motor, electromagnet device, etc. To provide a time/phase reference, an impulsive source (e.g., an air gun, water gun, sparker, etc.) 509 maybe be coupled to the body 508. A depth D of the source actuator relative to water surface 520 may be controlled with ballast weight 514 and/or with other mechanisms located inside body 508, as disclosed later with regard to FIG. 10A.

Figure 5B:
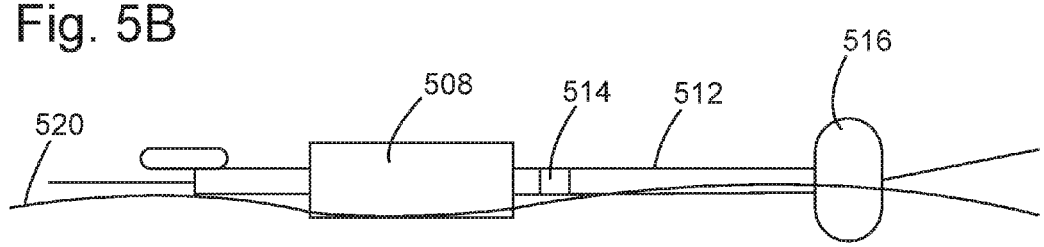
FIG. 5B shows the low-frequency source element in a towing position.

The configuration illustrated in FIGS. 5A-B is implemented as a buoy, i.e., there is no active mechanism for driving the source 506 or for maintaining its position relative to Earth. Also, there is no link between the ocean bottom and source element 506 so that it can drift with the currents. In other words, source element 506 is essentially stationary relative to Earth. Note that if no water currents exist, then the source element will be absolutely stationary relative to Earth.

Figure 6:
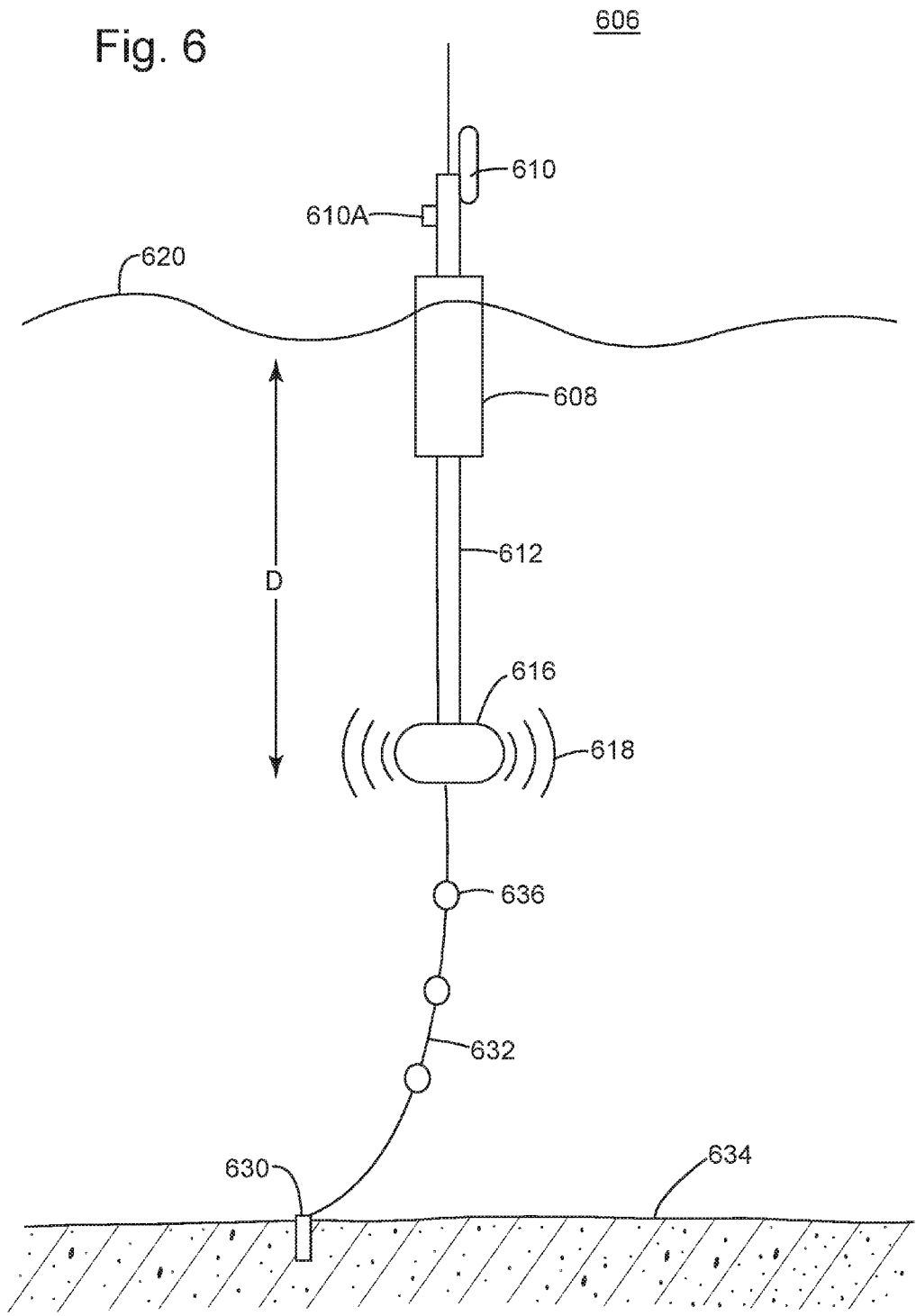
FIG. 6 shows a low-frequency source element being anchored to the ocean bottom.

In an embodiment illustrated in FIG. 6, modified low-frequency source element 606 includes an anchor 630 and a mooring line 632 for restraining the source element's motion. Anchor 630 may simply be a weight and it may be located on the ocean bottom 634, while mooring line 632 connects anchor 630 to source actuator 616 and/or body 608. In one application, mooring line 632 may also be connected to one or more sensors 636. Sensors 636 may be a hydrophone, an accelerometer, an optical sensor, an electromagnetic sensor or a combination thereof.

Figure 7:
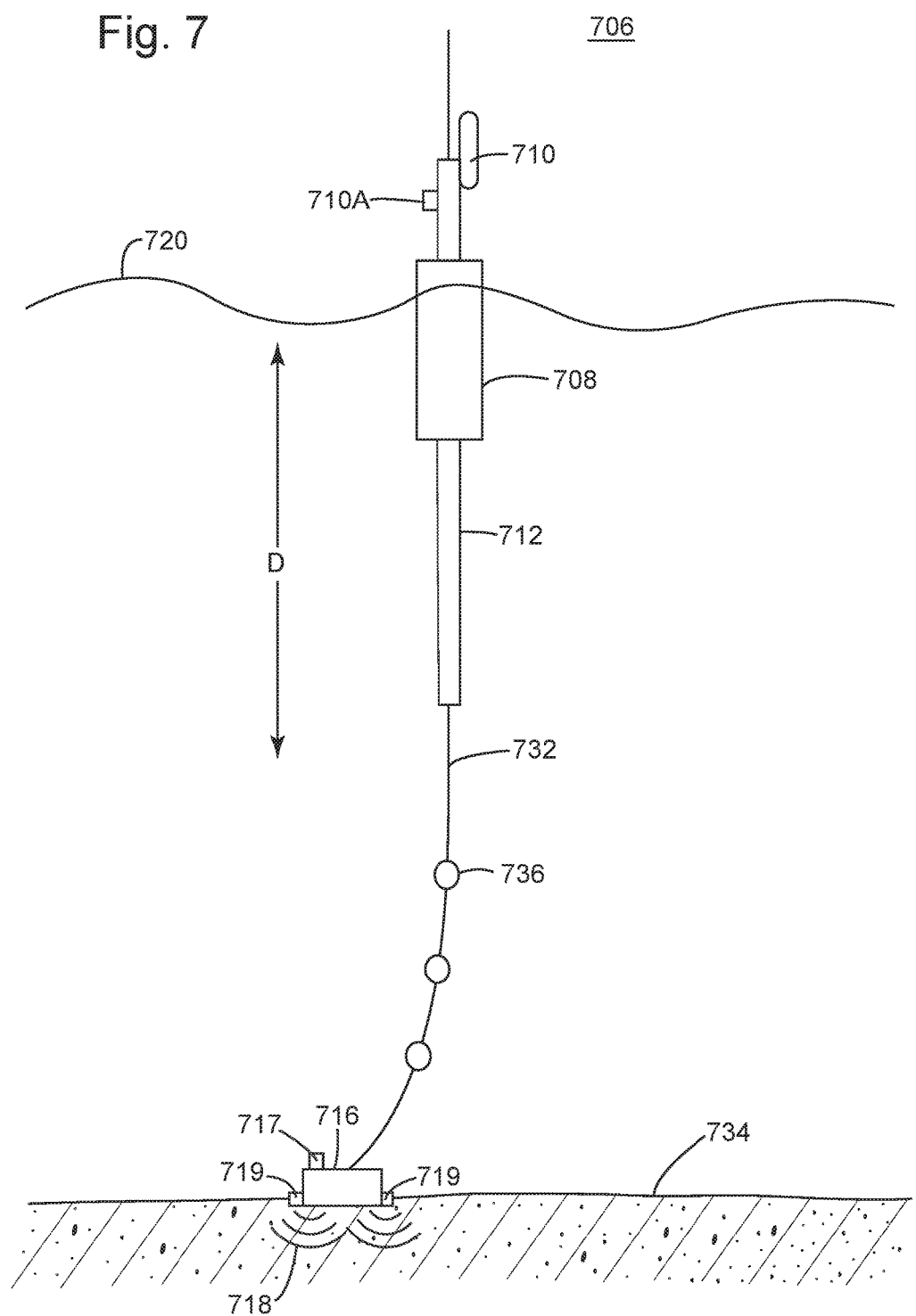
FIG. 7 shows a low-frequency source element having a source actuator located on the ocean bottom.

According to another embodiment illustrated in FIG. 7, low-frequency source element 706 is similar to source element 606 illustrated in FIG. 6 except that source actuator 716 is now used as an anchor and it is located on ocean bottom 734. In this embodiment, source actuator 716 is attached to one end of mooring line 732. Note that sensors 736 may or may not be present on mooring line 732. If source actuator 716 is located on the ocean bottom, it achieves a better coupling with the ground and, thus, the ability to generate not only P-waves but also S-waves. In one application, source actuator 716 has a burying mechanism 717 that is configured to bury the source in or under the ocean bottom (see U.S. application Ser. No. 14/103,216, filed on Dec. 11, 2013, the entire content of which is incorporated herein by reference, which discloses such a burying mechanism). The fixed location of low-frequency source allows the acquisition of ultra-long offset from the towed streamers.

In still another embodiment illustrated in FIG. 8, low-frequency source element 806 has a similar configuration as source element 606 except that no anchor is present. For this reason, source element 806 acts as a buoy that is free to move with the underwater currents, i.e., it is a drifting buoy as suggested by arrow 840. The operator of the seismic survey may calculate or retrieve information about local underwater currents present in the area of interest, and may calculate approximate trajectories that the low-frequency source element may take. Based on these projected trajectories, the trajectory of the vessel towing the streamers and/or additional source elements is calculated relative to the area of interest, based on the projected trajectories of the low-frequency source elements that act as drifting buoys. Those skilled in the art would understand that knowing the exact location of the source element, which is detected by GPS and transmitted via radio link to the survey's operator, or by underwater positioning devices such as ultra-long range acoustic systems is what is needed for the seismic survey. Moreover, an accurate positioning of the source could be tuned with the use of seismic records. The moving location of low-frequency source is not an issue, the natural bin size for these frequencies is very large and the illumination pattern will not be affected by the irregularity of source location.

Another embodiment is illustrated in FIG. 9, in which low-frequency source element 906 has a propulsion mechanism 940 for driving body 908 and source actuator 916 at a desired position or for maintaining a given position. Propulsion mechanism 940 may be based on a water pump, jet pump, propeller 942 or other known means in the art.

With regard to the internal configuration of the body 508 of the low-frequency source element 506, a possible arrangement is shown in FIG. 10A, which shows body 508 housing a CPU 1002a that is connected to an inertial navigation system (INS) 1004 (or compass or altitude sensor and acoustic transmitter for receiving acoustic guidance from the mother vessel), optional wireless interface 1006 for quickly exchanging data with a mother vessel prior to launching the source element or for exchanging information with an autonomous underwater vehicle, AUV, (for example, for maintenance reasons), pressure gauge 1008 for generating the depth of the source element, and transponder 1010 for acoustic communication with a vessel, if necessary. Note that some of the elements described in FIG. 10A are optional. CPU 1002a may be located in a high level control block 1012. The INS is advantageous when the source element has a propulsion system 1018, as illustrated in FIG. 10A, and the propulsion system is used for maintaining a given position or following a predetermined trajectory under water. If underwater currents are present and strong, the precision of the INS need to be high. The INS typically operates without input from a support vessel. However, the INS may be configured to receive data from the vessel, to increase the AUV's position accuracy. Note that source element 506 may reach a depth of 20 m, for example, using the buoyancy system 1030. A CPU 1002b, in addition to CPU 1002a, is part of a low-level control module 1014 configured to control attitude actuators 1016 and the propulsion system 1018 (if present).

One of the two CPUs may also be configured to actuate a source actuator. For example, an actuating schedule may be stored in a memory associated with the CPU, and the CPU may transmit actuating signals to the source actuator based on the stored actuating schedule. A local CPU at the source actuator receives these signals and triggers the source, be it impulsive or vibratory. One or more power supplies 1020 (e.g., a battery) may be located in the body 508. Power supply 1020 is configured to supply electric power to all other components of the source element, like positioning device, sensors, communication mechanism, source actuator, etc. In one application, the power supply should be autonomous for a long duration and delivering high energy (e.g., 0.5 and 2.5 MW). Thus, in one embodiment, the power source may be a gas or fuel cell. Natural energy (e.g., sea wave, current, sunlight, wind, etc.) may also be considered for the power source or at least as a backup power source.

A seismic payload 1022 may be located inside the body for recording seismic signals. Those skilled in the art would appreciate that more modules may be added inside the AUV. Seismic payload may also be any of the sensors 636 discussed above with regard to FIG. 6. For example, if a sensor is located outside the body 508, for example, on source actuator 716, a skirt 719 may be provided around or next to the sensor. A water pump may pump water from the skirt to achieve suction so that a good coupling between the sensor and the seabed is achieved, as illustrated in FIG. 7. However, there are embodiments where no coupling with the seabed is desired. For those embodiments, no skirt is used. The seismic payload may also include non-seismic sensors, e.g., sensors related to current heading, current speed, water salinity, sea state, wind direction, sea noise, etc. Other sensors may be distributed throughout the source element for monitoring the generated signal, fuel capacity, operational indicators, etc.

According to an embodiment illustrated in FIG. 10A, body 508 may be shaped to have a platform 1050 at the top portion so that a compressor (not shown) and other equipment 1056 may be added, for example, for producing and supplying the compressed air that might be necessary to the source element. Alternatively, the compressor and other compressor-related equipment may be located inside body 508 as also illustrated in FIG. 10A. Those skilled in the art would recognize that platform 1050 may be large enough to support one or more persons 1054 and associated equipment 1056, as, for example, a controller, communication device, housing, positioning device 1052, etc.

Figure 10B:
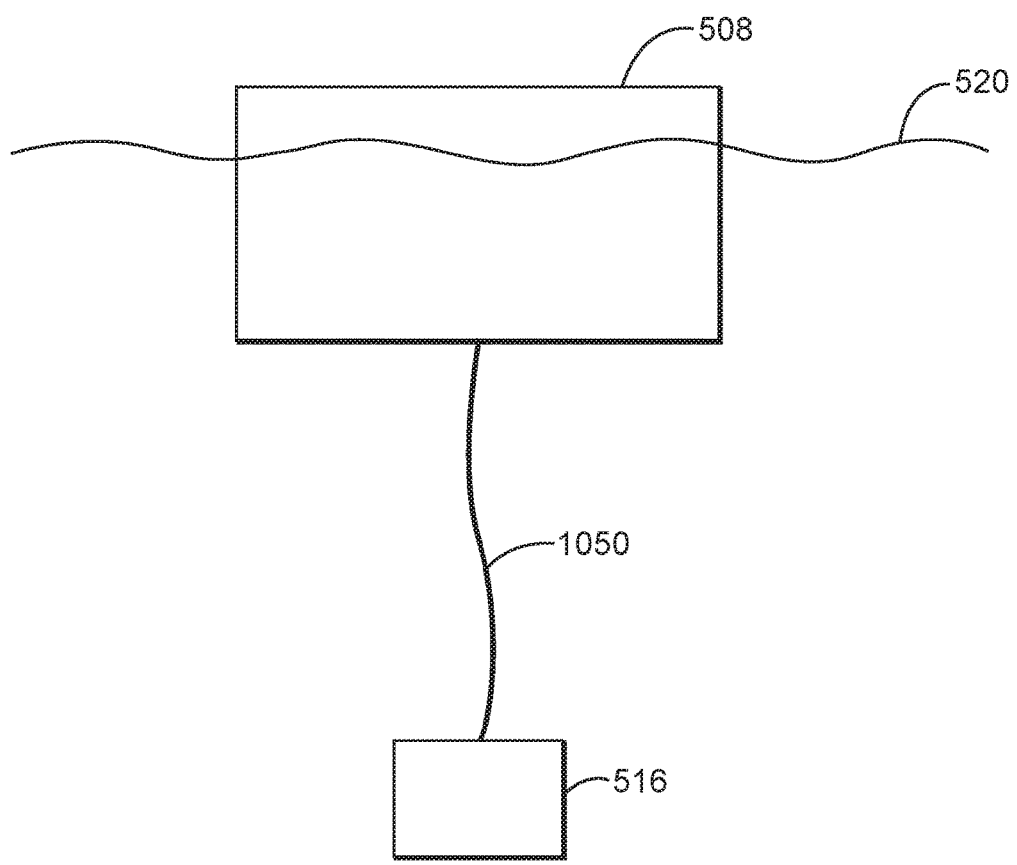
FIG. 10B shows a body that is connected with a tether to a source actuator.

In another embodiment illustrated in FIG. 10B, body 508 may be a floating platform or a barge or a support vessel that floats at water surface 520 and can supply air, power, data, etc. to increase autonomy and facilitate moving of the low-frequency source from one location to another location. Body 508 may be linked to source actuator 516 with a tether 1050. Body 508 may have the internal configuration shown in FIG. 10A. Tether 1050 may be used to supply one or more of power, compressed air, data, etc. to source actuator 516.

While FIGS. 5-9 show a single low-frequency source element, note that as discussed with regard to FIG. 4, any number of these source elements may be used. Also, note that the low-frequency source elements may be located far away from the vessel towing the streamers because low-frequency waves propagate long distances. The low-frequency source elements illustrated in FIGS. 5-9 are configured to float by themselves during a seismic survey and mostly to remain stationary. Due to their large weight and size, they essentially remain stationary during a seismic survey, except if strong underwater currents or strong winds are present. To be deployed to a dedicated position, the source element may be towed by a support vessel from a given port. However, that support vessel will not be capable of also towing streamers and maintaining the required speed for performing the seismic survey when towing the low-frequency source element. Thus, those skilled in the art would know that although the low-frequency source element can be towed by a vessel from its port to its dedicated position, the source element will not be towed by a streamer vessel. In one embodiment, the support vessel may have one or more cranes for lifting the source element from the water onto its deck. In another embodiment, the source element may be airlifted with a dedicated helicopter or air balloon, etc.

Figure 11:
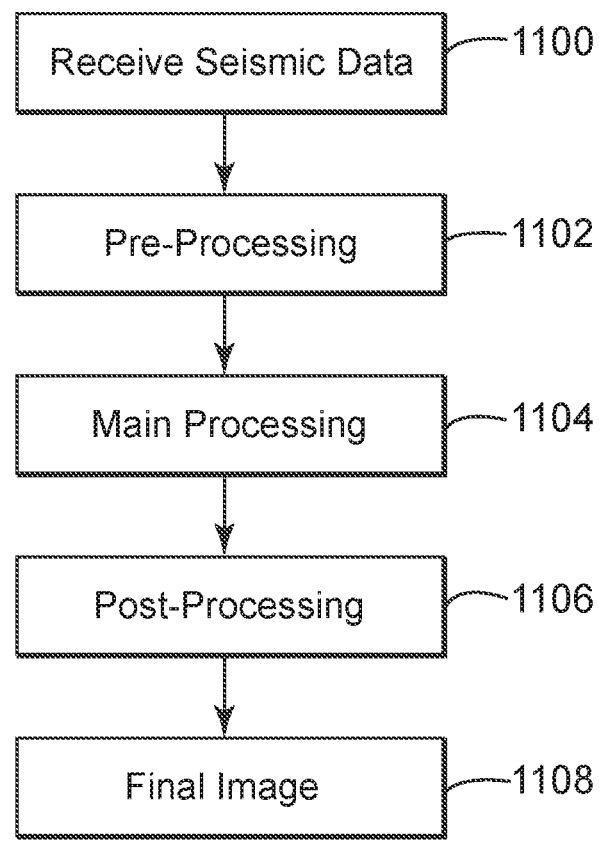
FIG. 11 is a flowchart of a method for processing seismic data generated with a low-frequency source element, including Velocity Model Building with the use of Full Wave Inversion of low-frequencies.

Seismic data recorded with streamers 404, (or with AUVs or other nodes, stationary on the ocean bottom or traveling) which might have ghost and polarity diversity if the streamers are curved in a vertical direction, may be processed in a corresponding processing device for generating a final image of the surveyed subsurface as discussed now with regard to FIG. 11. For example, the seismic data collected with the streamers as discussed with regard to FIG. 4 may be received in step 1100 at the processing device. In step 1102, pre-processing methods are applied, e.g., demultiple, signature deconvolution, trace summing, motion correction, vibroseis correlation, resampling, etc. In step 1104, the main processing takes place, e.g., deconvolution, amplitude analysis, statics determination, common middle point gathering, velocity analysis, normal move-out correction, muting, trace equalization, stacking, noise rejection, amplitude equalization, etc. In step 1106, final or post-processing methods are applied, e.g., migration, wavelet processing, seismic attribute estimation, inversion, etc., and in step 1108 the final image of the subsurface is generated. Note that by generating the seismic data with one of the seismic sources described in FIGS. 5-9, the frequency spectrum is broader and/or richer due to the additional low-frequency component, and thus, the quality of the imaged subsurface is better. Improved image quality will result in an increased likelihood of finding oil and gas reservoirs.

Figure 12:
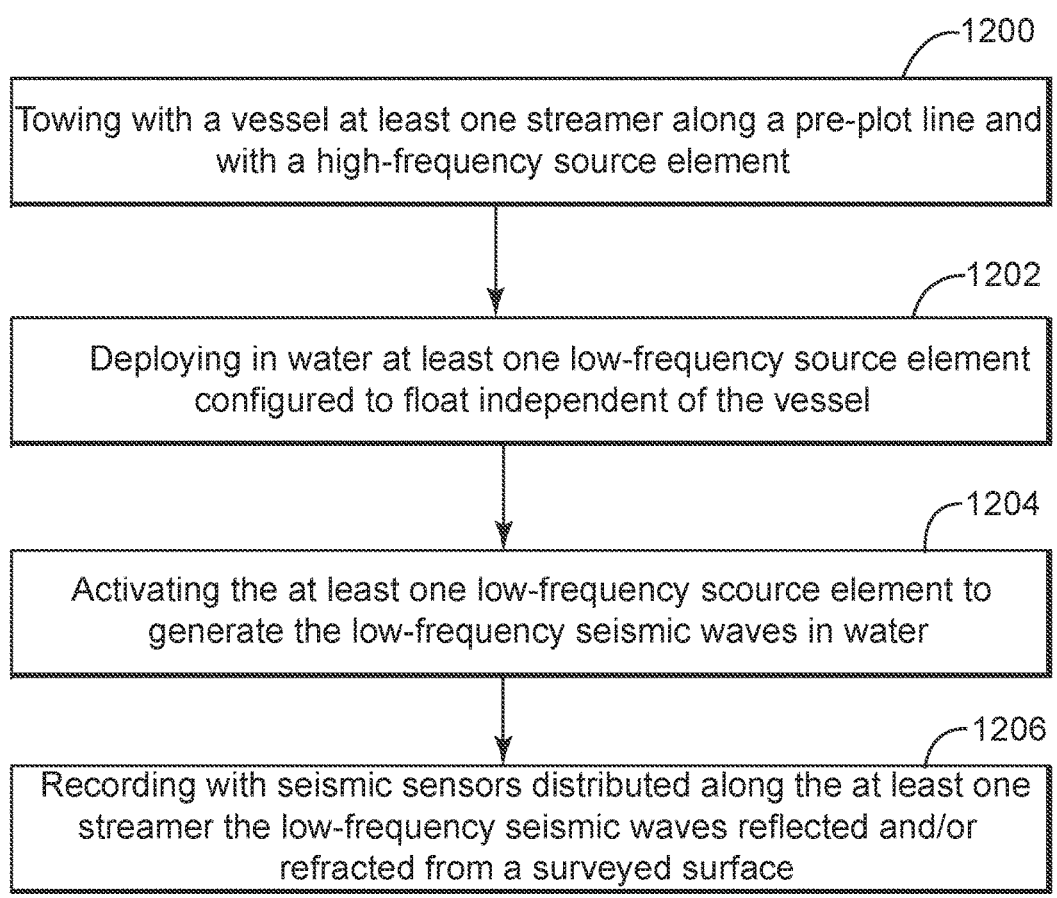
FIG. 12 is a flowchart of a method for deploying and generating low-frequency seismic waves with a low-frequency source element.

A method for using one or more of the low-frequency source elements discussed above is now discussed with regard to FIG. 12. The method includes a step 1200 of towing with a vessel 402 at least one streamer 404 along a pre-plot line 403 and a high-frequency source element 408, a step 1202 of deploying in water at least one low-frequency source element 406A configured to float independent of the vessel, a step 1204 of activating the at least one low-frequency source element 406A to generate low-frequency seismic waves in water, and a step 1206 of recording with seismic sensors 405, distributed along the at least one streamer, the low-frequency seismic waves reflected and/or refracted from a surveyed subsurface.

Figure 13:
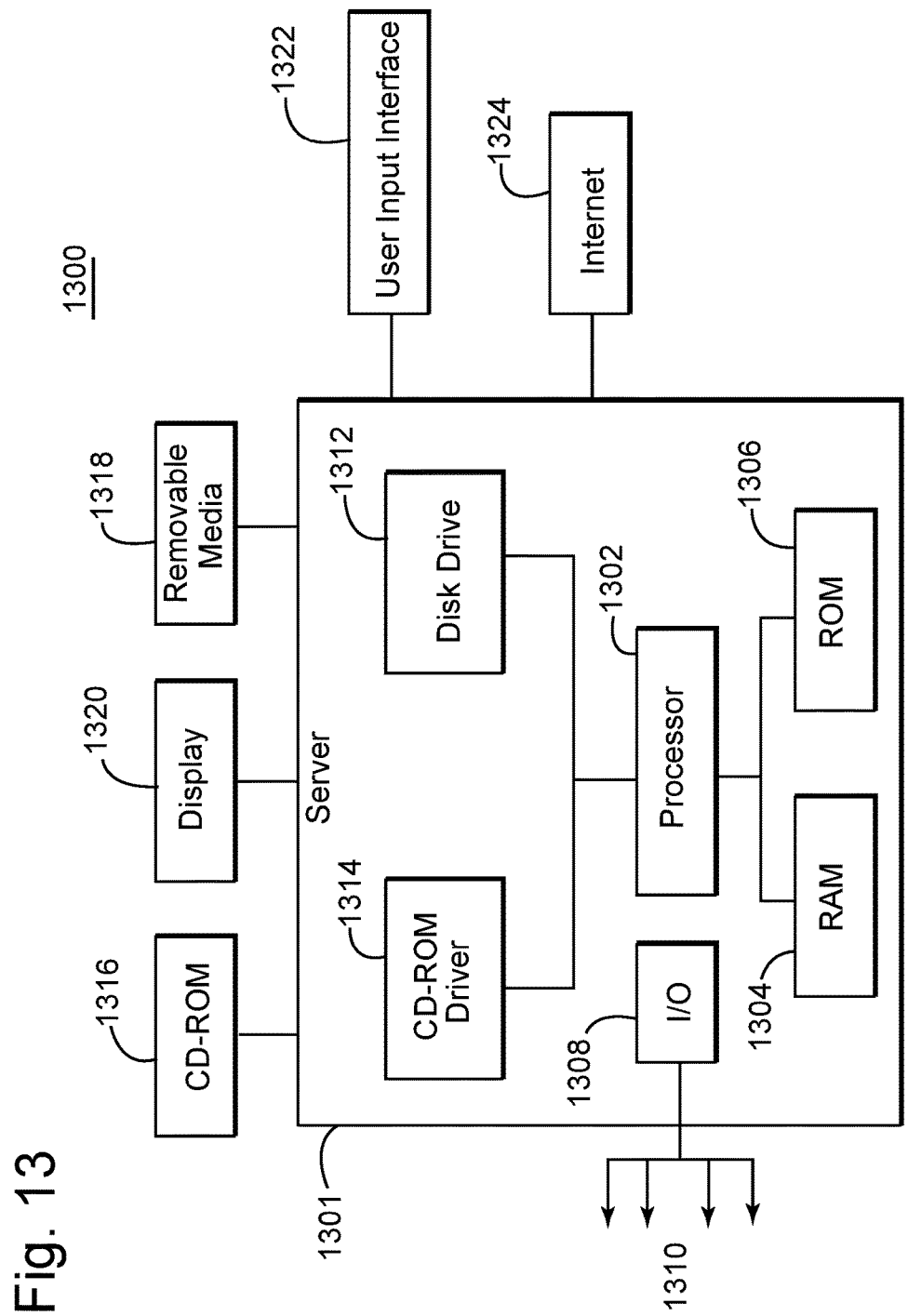
FIG. 13 is a schematic diagram of a control device for implementing methods as noted above.

An example of a representative processing (or control) device capable of carrying out operations in accordance with the embodiments discussed above is illustrated in FIG. 13. Note that the processing device may be implemented in the body 508 of source element 506, the source actuator 516, distributed between these elements or distributed on the source element and the vessel or another support device. Hardware, firmware, software or a combination thereof may be used to perform the various steps and operations described herein. The processing device 1300 of FIG. 13 is an exemplary computing structure that may implement any of the processes and methods discussed above or combinations of them.

The exemplary processing device 1300 suitable for performing the activities described in the exemplary embodiments may include server 1301. Such a server 1301 may include a central processor unit (CPU) 1302 coupled to a random access memory (RAM) 1304 and/or to a read-only memory (ROM) 1306. ROM 1306 may also be other types of storage media to store programs, such as programmable ROM (PROM), erasable PROM (EPROM), etc. Processor 1302 may communicate with other internal and external components through input/output (I/O) circuitry 1308 and bussing 1310 to provide control signals and the like. For example, processor 1302 may communicate with appropriate valves of the source elements for controlling the air pressure inside each source element. Processor 1302 carries out a variety of functions as are known in the art, as dictated by software and/or firmware instructions.

Server 1301 may also include one or more data storage devices, including disk drives 1312, CD-ROM drives 1314, and other hardware capable of reading and/or storing information, such as a DVD, etc. In one embodiment, software for carrying out the above-discussed steps may be stored and distributed on a CD-ROM 1316, removable media 1318 or other form of media capable of storing information. The storage media may be inserted into, and read by, devices such as the CD-ROM drive 1314, disk drive 1312, etc. Server 1301 may be coupled to a display 1320, which may be any type of known display or presentation screen, such as LCD, plasma displays, cathode ray tubes (CRT), etc. A user input interface 1322 is provided, including one or more user interface mechanisms such as a mouse, keyboard, microphone, touchpad, touch screen, voice-recognition system, etc.

Server 1301 may be coupled to other computing devices, such as the equipment of a vessel, via a network. The server may be part of a larger network configuration as in a global area network (GAN) such as the Internet 1324, which allows ultimate connection to various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

The disclosed exemplary embodiments provide a method and a source element capable of boosting an energy generated in the 0.5 to 5 Hz range. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine seismic acquisition system for collecting seismic data, the system comprising:
   plural source elements deployed at predetermined locations and configured to generate seismic waves with frequencies between 0.5 and 5 Hz;
   a vessel that advances along a pre-plot line; and
   plural streamers attached to the vessel and including seismic sensors for collecting the seismic data generated by detecting the seismic waves,
   wherein the source elements are autonomous from the vessel, not towed while seismic data is collected.

2. The system of claim 1, wherein the plural source elements are implemented as buoys.

3. The system of claim 1, wherein the plural source elements drift with underwater currents.

4. The system of claim 1, wherein a source element comprises:
   a body that floats at the water surface and houses a communication system enabling to establish a current position of the seismic source;
   a source actuator located underwater, that generates the seismic waves; and
   a tether that connects the body to the source actuator.

5. The system of claim 4, wherein the body is a floating platform.

6. The system of claim 4, wherein the body is a barge.

7. The system of claim 4, wherein the body is a support vessel.

8. The system of claim 4, wherein the source actuator is an air gun.

9. The system of claim 4, wherein the source actuator is an electro-mechanical actuator.

10. The system of claim 4, wherein the source actuator is a siren.

11. The system of claim 4, further comprising:
    a propulsion mechanism for maintaining a given position of the source element.

12. The system of claim 1, further comprising:
    a propulsion mechanism for driving the source element to a desired position.

13. A marine seismic acquisition system for collecting seismic data, the system comprising:
    a seismic source deployed at a predetermined location and configured to generate seismic waves with frequencies between 0.5 and 5 Hz;
    a vessel that advances along a pre-plot line; and
    plural streamers attached to the vessel and including seismic sensors for collecting the seismic data generated by detecting the seismic waves,
    wherein the seismic source is not towed along the pre-plot line.

14. The system of claim 13, wherein the vessel has another seismic source that is towed by the vessel.

15. The system of claim 13, wherein the seismic source comprises:
    a body that floats at the water surface and houses a communication system enabling to establish a current position of the seismic source;
    a source actuator located underwater, that generates the seismic waves; and
    a tether that connects the body to the source actuator.

16. The system of claim 15, wherein the body is a floating platform.

17. The system of claim 15, wherein the body is a barge.

18. The system of claim 15, wherein the body is a support vessel.

19. The system of claim 15, wherein the seismic source includes an air gun.

20. The system of claim 15, wherein the seismic source includes an electro-mechanical actuator.

* * * * *